(12) United States Patent
Amundson et al.

(10) Patent No.: US 6,192,177 B1
(45) Date of Patent: Feb. 20, 2001

(54) ELECTRICALLY MODIFIABLE OPTICAL GRATING DEVICES

(75) Inventors: Karl R. Amundson, Morristown; Benjamin John Eggleton, Berkeley Heights; John A. Rogers, New Providence, all of NJ (US); Jefferson Lynn Wagener, Charlottesville, VA (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/118,201

(22) Filed: Jul. 17, 1998

(51) Int. Cl.⁷ .................................................. G02B 6/34
(52) U.S. Cl. ........................... 385/37; 385/40; 359/570; 359/573
(58) Field of Search ...................... 385/12, 13, 31, 385/37, 39, 40, 101; 359/566, 569, 570, 573, 574

(56) References Cited

U.S. PATENT DOCUMENTS

| 3,804,489 | * | 4/1974 | Li et al. ............................... 359/320 |
| 5,007,705 | * | 4/1991 | Morey et al. ........................... 385/12 |
| 5,647,039 | * | 7/1997 | Judkins et al. .......................... 385/37 |
| 5,991,071 | * | 11/1999 | Naito .................................... 359/341 |
| 6,058,226 | * | 5/2000 | Starodubov ............................ 385/12 |

* cited by examiner

*Primary Examiner*—John D. Lee
(74) *Attorney, Agent, or Firm*—Mathews, Collins, Shepherd & Gould, P.A.

(57) ABSTRACT

In accordance with the invention, an electrically modifiable optical fiber grating device is made by providing a fiber including a grating and forming a plurality of electrically conductive elements along the grating. In response to an electrical signal, the conductive elements modify the grating. In a preferred embodiment, a fiber grating is provided with a plurality of heating elements spaced to selectively heat different portions of the grating. This chirps the spacing between elements of the grating and thereby increases the bandwidth of the device.

15 Claims, 2 Drawing Sheets

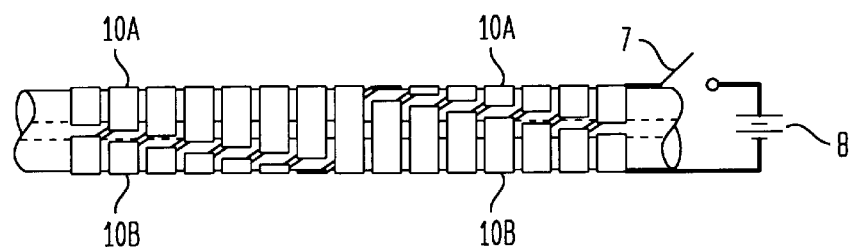
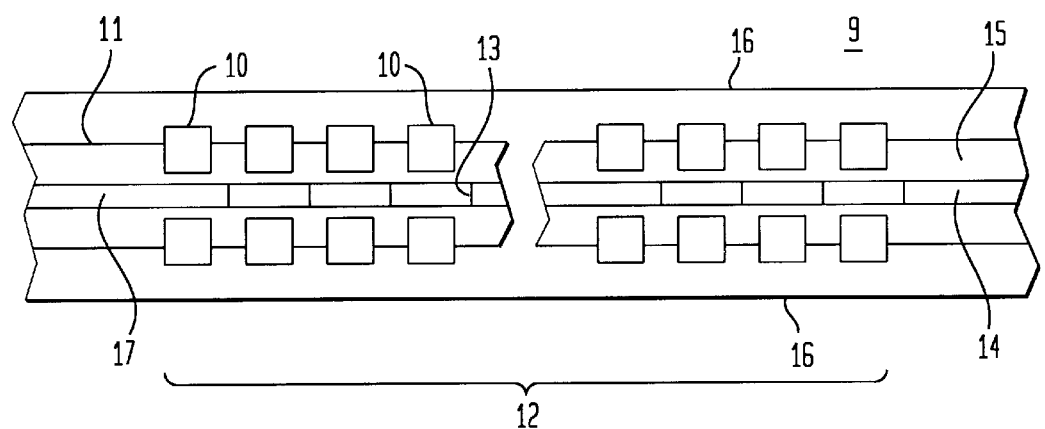

ELECTRICALLY MODIFIABLE OPTICAL GRATING DEVICES

FIELD OF THE INVENTION

The present invention relates to electrically modifiable optical grating devices and to methods for making them. In particular it concerns optical fiber gratings and conductive elements which, in response to an electrical signal, can modify the gratings.

BACKGROUND OF THE INVENTION

Optical fibers are key components in modern telecommunication systems. Basically, optical fibers are thin strands of glass capable of transmitting an optical signal containing a large amount of information over long distances with very low loss. In essence, an optical fiber is a small diameter waveguide comprising a core having a first index of refraction surrounded by a cladding having a second (lower) index of refraction. Typical optical fibers are made of high purity silica with minor concentrations of dopants to control the index of refraction.

Optical gratings are important elements for selectively controlling specific wavelengths of light within optical systems such as optical communication systems. Such gratings include Bragg gratings and long period gratings. Such gratings typically comprise a body of material and a plurality of substantially equally spaced optical grating elements such as index perturbations, slits or grooves. The ability to electrically modify these gratings would both be highly useful.

A typical Bragg grating comprises a length of optical waveguide, such as optical fiber, including a plurality of perturbations in the index of refraction substantially equally spaced along the waveguide length. These perturbations selectively reflect light of wavelength $\lambda$ equal to twice the spacing $\Lambda$ between successive perturbations times the effective refractive index, i.e. $\lambda = 2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, adding and dropping signal channels, stabilization of semiconductor lasers, reflection of fiber amplifier pump energy, and compensation for waveguide dispersion.

Waveguide Bragg gratings are conventionally fabricated by doping a waveguide core with one or more dopants sensitive to ultraviolet light, e.g., germanium or phosphorous, and exposing the waveguide at spatially periodic intervals to a high intensity ultraviolet light source, e.g., an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

Difficulties with conventional Bragg gratings are that they are essentially permanent, and they filter only a fixed wavelength. Each grating selectively reflects only light in a narrow bandwidth centered around $m\lambda = 2n_{eff}\Lambda$, where m=1, 2,3 . . . is the order of the grating. However in many applications, such as wavelength division multiplexing (WDM), it is desirable to have gratings which can be controllably altered in wavelength or bandwidth.

Long-period fiber grating devices provide wavelength dependent loss and may be used for spectral shaping. A long-period grating couples optical power between two copropagating modes with very low back reflections. It typically comprises a length of optical waveguide wherein a plurality of refractive index perturbations are spaced along the waveguide by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $\frac{1}{5}\Lambda'$ to $\frac{4}{5}\Lambda'$. In some applications, such as chirped gratings, the spacing $\Lambda'$ can vary along the length of the grating.

Long-period fiber grating devices selectively remove light at specific wavelengths by mode conversion. In contrast with conventional Bragg gratings in which light is reflected and stays in the waveguide core, long-period gratings remove light without reflection, as by converting it from a guided mode to a non-guided mode. A non-guided mode is a mode which is not confined to the core, but rather, is defined by the entire waveguide structure. Often, it is a cladding mode. The spacing $\Lambda'$ of the perturbations is chosen to shift transmitted light in the region of a selected peak wavelength $\lambda_p$ from a guided mode into a nonguided mode, thereby reducing in intensity a band of light centered about the peak wavelength $\lambda_p$. Alternatively, the spacing $\Lambda'$ can be chosen to shift light from one guided mode to a second guided mode (typically a higher order mode), which is substantially stripped off the fiber to provide a wavelength dependent loss. Such devices are particularly useful for equalizing amplifier gain at different wavelengths of an optical communications system.

Conventional long-period gratings are also permanent and narrowband. Each long-period grating with a given periodicity ($\Lambda'$) selectively filters light in a narrow bandwidth centered around the peak wavelength of coupling, $\lambda_p$. This wavelength is determined by $\lambda_p = (n_g - n_{ng}) \cdot \Lambda'$, where $n_g$ and $n_{ng}$ are the effective indices of the core and the cladding modes, respectively. The value of $n_g$ is dependent on the core and cladding refractive index while $n_{ng}$ is dependent on core, cladding and ambient indices.

In the future, multi-wavelength communication systems will require reconfiguration and reallocation of wavelengths among the various nodes of a network depending on user requirements, e.g., with programmable add/drop elements. This reconfiguration will impact upon the gain of the optical amplifier. As the number of channels passing through the amplifier changes, the amplifier will start showing deleterious peaks in its gain spectrum, requiring modification of the long-period grating used to flatten the amplifier.

Thus, there is a need for Bragg gratings and long period gratings which can be electrically modified.

SUMMARY OF THE INVENTION

In accordance with the invention, an electrically modifiable optical fiber grating device is made by providing a fiber including a grating and forming a plurality of electrically conductive elements along the grating. In response to an electrical signal, the conductive elements modify the grating. In a preferred embodiment, a fiber grating is provided with a plurality of heating elements spaced to selectively heat different portions of the grating. This chirps the spacing between elements of the grating and thereby increases the bandwidth of the device.

BRIEF DESCRIPTION OF THE DRAWINGS

The nature, advantages and various additional features of the invention will appear more fully upon consideration of the illustrative embodiments now to be described in connection with the accompanying drawings. In the drawings:

FIGS. 2A, 2B and 2C illustrate electrode configurations useful in the method of FIG. 1; and FIG. 3 schematically illustrates an exemplary embodiment of an electrically modifiable grating device.

It is to be understood that these drawings are for purposes of illustrating the concepts of the invention and are not to scale.

DETAILED DESCRIPTION

Figure 1:
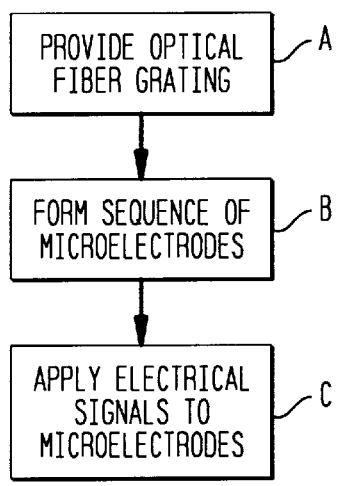
FIG. 1 is a block diagram schematically illustrating the steps in making an electrically modifiable grating device in accordance with the invention.

Referring to the drawings, FIG. 1 is a schematic block diagram showing the steps in making a modifiable optical fiber grating device in accordance with the invention. As shown in block A, the first step is to provide a length of optical fiber including a grating device. The fiber can be single mode or multimode optical fiber. The grating can be a conventional Bragg grating or a long period grating.

Preferably the fiber, as provided or subsequently modified, includes an electrically actuable component. An electrically actuable component for these purposes is a material which will produce a local perturbation in the optical properties of the fiber in response to the application of voltage across electrode pairs on the fiber or in response to the application of current through a helical conductor on the fiber. The preferred perturbation is a local change in the refractive index in excess of 0.01%. The actuable component can be an electro-optic material, a magneto-optic material, a piezoelectric material, an electrostrictive material, a magnetostrictive material or a Faraday effect material. The actuable component is typically disposed in or near the core region of the fiber but can also be coated on the cladding.

Figure 2A:
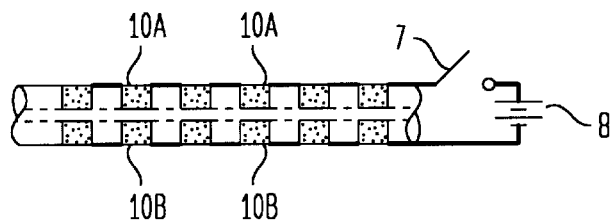
Figure 2B:
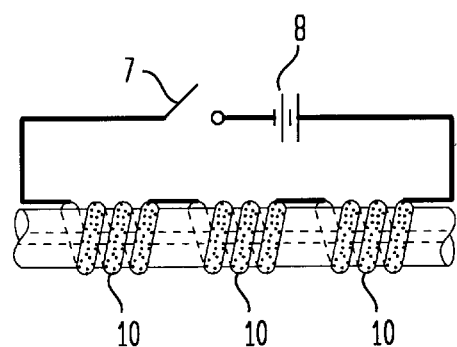

The next step, shown in block B, is to form along the grating a sequence of small conductive elements (hereinafter "microelectrodes") with spacing appropriate for modifying the grating. The microelectrodes can be in the form of a sequence of capacitor electrode pairs 10A and 10B across the fiber diameter as shown in FIG. 2A, a sequence of of helical coils about the fiber as shown in FIG. 2B, or a helix of capacitor pairs as shown in FIG. 2C. The spacings between successive electrodes (edge-to-edge separations) are typically in the range between 1 mm and 200 nanometers and preferably 500 micrometers to 200 nanometers. The maximum lateral dimension of the microelectrode is typically in the range 500 micrometers to 100 nanometers.

Capacitor pair electrodes of conductive metal can be used with electro-optic actuable materials. They can also be used with piezoelectric actuable materials such as ZnO or PZT, or electrostrictive materials such as KDP. In these latter cases, application of voltage to the capacitors causes, through piezoelectric or electrostrictive effect, localized mechanical strain in the fiber. This compression causes dimensional changes and slight perturbations in the index of refraction in a geometry that mirrors the capacitor array.

Helical conductive elements shown in FIG. 2B can be used with actuable materials that display the Faraday effect (e.g., Fe, Ni or Co) placed in or near the fiber core. Alternatively, with sufficient current, the helical elements will heat sufficiently to produce periodic changes in index or dimension in a thermo-optic actuable material or with a material that exhibits sufficient changes in dimension due to thermal expansion, respectively. The silica glass itself undergoes changes in index with temperatures that are suitably large (e.g. a change of 50° C.).

The helix of microelectrode pairs shown in FIG. 2C can be used with actuable materials as described for the FIG. 2A structures. However it has the added advantage of ensuring that the electrical fields are applied in a direction which varies along the length of the grating, thus providing an operation that is independent of polarization.

Such conductive elements are preferably formed on the fiber by the microprinting technique described in U.S. patent application Ser. No. 08/677,309 filed Jul. 9, 1996 by H. Biebuyck et al (now U.S. Pat. No. 5,900,160) and entitled "Microcontact Printing on Surfaces and Derivative Articles", U.S. patent application Ser. No. 08/616,929 filed Mar. 15, 1996 by R. J. Jackman et al (now abandoned) and entitled "Method of Forming Articles and Patterning Surfaces Via Capillary Micromolding", and U.S. patent application Ser. No. 08/681,235 entitled "Fabrication of Small Scale Coils and Bands . . . " filed by Rogers et al., Jul. 22, 1996 (now U.S. Pat. No. 5,951,881). All three of these applications are incorporated herein by reference.

The methods are also described in the following articles: John A. Rogers, et al., "Using Microcontact Printing to Generate Photomasks on the Surface of Optical Fibers: A New Method for Producing In-Fiber Gratings," *Applied Physics Letters*, 70(1), 7–9 (1997); John A. Rogers, et al., "Constructing Single and Multiple Helical Microcoils and haracterizing Their Performance as Components of Microinductors and Microelectromagnets," *Journal of Microelectromechanical Systems* (JMEMS) 6(3), 184–102 (1997); and John A. Rogers, et al., "Using Microcontact Printing to Fabricate Microcoils on Capillaries for High Resolution 'H-NMR on Nanoliter Volumes," *Applied Physics Letters*, 70(18), 2464–2466 (1997). The three articles by Rogers et al. are incorporated herein by reference.

Typically the microelectrodes are made of conductive metal or resistive metal. Other electrode materials useful in establishing gratings are conductive metal, piezoelectric material, electrostrictive material and magnetostrictive material. The electrodes can be interconnected or individually addressable.

The third step shown in block C, is to apply electrical signals to the microelectrodes to modify the periodic sequence of index perturbations constituting a grating. As illustrated in FIG. 2A, switch 7 applies voltage from source 8 across capacitor pairs 10A and 10B and thus across the fiber. In FIG. 2B, switch 7 applies current from source 8 through the helical elements 10, thereby forming a magnetic field within the fiber. As a practical matter the perturbations should be achievable by voltages of less than 10 KV or currents less than 10 A.

FIG. 3 schematically illustrates an exemplary optical device 9 made by the process of FIG. 1. The device 9 comprises a length of optical fiber 11 including an optical grating 12 comprising a sequence of index perturbations 13 and a plurality of microelectrodes 10 along the grating. The fiber 11 typically comprises a central core 14, an outer cladding 15 and may include an outer protective polymeric coating 16. The microelectrodes may be of resistive metal to modify the grating by local heating.

Alternatively, the microelectrodes can be of conductive metal, and the fiber may include along the region of grating 12 an electrically actuable component 17 responsive to an electrical signal applied to the conductive electrodes for locally varying the fiber refractive index. The component 17 is preferably disposed in or near the fiber core. The fiber 11 can be single mode or multimode. The electrodes 10 are appropriately spaced along the fiber for modifying the grating device. For example a sequence of monotonically increasing spacings may be used to broaden the bandwidth of the grating by chirping.

In operation an electrical signal applied to the electrodes acts locally on the grating in the region near each electrode to vary the refractive index in the fiber. This variation modifies the grating.

The nature and method for making such devices may be more clearly understood by consideration of the following examples.

EXAMPLE 1 (Thermally Chirped In-Fiber Bragg Grating)

A Bragg grating at 1550 nm is conventionally formed in a single-mode fiber. Specifically, a standard telecommunication 5D fiber with a germanium-doped core is exposed to 242 nm light through a phase mask with periodicity of 1069 nm. Metal layers comprising ~50 A Ti, 500 A Au are deposited onto the fiber. The metal layers are formed into an array of resistive heaters to generate distributed heating of the fiber in a geometry that creates, through thermal expansion and the temperature dependence of the index of refraction, a desired chirp in the Bragg wavelength. A linear change in the density of heating elements along the length of the grating produces a linear chirp in the grating. A ~2 nm chirp is generated when the temperature change at one end of the grating is ~100 C higher than the other end. This heating can be induced by passing ~25 mA through a resistive heating element with resistance of ~300 ohms. For the example here, the heating element is a coating printed with thick bands of metal; the density of the bands varies linearly down the length of the fiber.

The forming step involves using the above-described microprinting technique to print an array of interconnected resistive heaters onto the outside of the fiber. 1) A chrome-on-quartz mask is fabricated with the geometry of the pattern to be printed on the fiber. 2) Photolithography is performed with this photomask to generate a pattern in photoresist (Shipley 1818, thickness ~2 $\mu$m) on a silicon wafer. 3) The exposed regions of he silicon are fluorinated by placing the wafer in a silane vapor (tridecafluoro-1,1,2,2-tetrahydrooctyl-1-trichlorosilane). 4). A liquid prepolymer of polydimethylsiloxane (Dow Corning Sylgard 184) is poured onto the wafer. 5) The elastomer is cured by heating at 85° C. for 2 hours. 6) The elastomer is removed and a solution of hexadecanethiol (HDT) in ethanol (~1 mM) is applied to the surface of the elastomer. 7) Using translation and rotation stages, the fiber is oriented relative to the pattern on the stamp, brought into contact with the stamp, and rolled over the stamp surface. 8) Deposition of copper is induced onto regions of the fiber not printed with HDT by placing the printed fiber into an electroless copper plating bath (3 g $CuSO_4$, 14 g sodium potassium tartrate, 4 g of NaOH in 100 mL $H_2O$), 9), and electrical connections are made with silver epoxy.

In operation electrical connection is made to the fiber, and current is driven through the heaters. Thermal expansion and changes in index of refraction with temperature causes local changes in the periodicity of the Bragg grating. A linearly varying change in temperature along the length of the grating causes a linear chirp in the grating.

EXAMPLE 2 (Switchable Long Period Grating)

A single mode fiber with two holes disposed in the cladding at distances well separated from the fundamental mode is fabricated by drilling and then pulling a fiber preform. The diameter of the core is 4 $\mu$m and $\Delta n=0.028$. The air holes are 15 $\mu$m in diameter and lie 25 $\mu$m from the core. The outer diameter of the fiber is 100 $\mu$m.

A 3 cm long, 270 $\mu$m period grating is written into the core using a KrF excimer laser. (The core is $D_2$ loaded and Ge doped). This grating produces a spectral loss feature at 1510 nm. The holes in the fiber are then filled with liquid crystal (E. Merck, E7) by capillary action. The presence of the liquid crystal shifts the 1510 nm feature to 1495 nm, but the strength of attenuation (~5.5 dB) does not change.

Parallel-plate electrodes that spiral down the length of the grating as shown in FIG. 2C are printed onto the fiber as follows: 1) 25 angstroms of Ti and 1000 angstroms of Ag are deposited onto the entire outside surface of the fiber. 2) A chrome-on-quartz mask with the geometry of the pattern to be printed on the fiber is provided. 3) Photolithography with this photomask is used to generate a pattern in photoresist (Shipley 1818, thickness ~2 $\mu$m) on a silicon wafer. 4) The exposed regions of the silicon is fluorinated by placing the wafer in a silane vapor (tridecafluoro-1,1,2,2-tetrahydrooctyl-1-trichlorosilane). 5) Liquid prepolymer to polydimethylsiloxane (Dow Corning Sylgard 184) is poured onto the wafer. 6) The elastomer is cured by heating at 85° C. for ~2 hours. 7) The elastomer is removed and a solution of hexadecanethiol (HDT) in ethanol (~1 mM) is applied to the surface of the elastomer. 8) Using translation and rotation stages, the fiber is oriented relative to the pattern on the stamp, brought into contact with the stamp, and the fiber is rolled over the stamp surface. 9) The printed fiber is placed into a liquid etchant (1 m $MK_4Fe(CN)_6$, 10 m$MK_3Fe(CN)_6$, 0.1 $MNa_2S_2O_3$ in water) that removes the silver not coated with HDT. 10) The etched fiber is placed into ~1% HF for ~10 seconds to remove the exposed Ti, and 11) electrical connection is made with silver epoxy.

The pitch of the spiral is large compared to the periodicity of the grating, but is smaller than the extent of the grating. The spatial variation of the direction of the electric field induced by applying voltage to the printed spiral electrodes minimizes polarization sensitivity of the device. Applying AC voltage (~60 Hz) of approximately 120 volts changes the overlap between the core mode and the cladding mode (which interacts with the liquid crystal), and eliminates the spectral loss at 1495 nm.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A modifiable optical fiber grating comprising:

a length of optical fiber including an optical fiber grating comprising a sequence of perturbations in the optical properties of the fiber disposed along a grating region of said fiber;

disposed along said grating region a plurality of conductive elements coupled to said fiber, each said conductive element responsive to an applied electrical signal to act locally on the grating in the region near the electrode to vary the local refractive index of the fiber, said conductive elements positioned in relation to said grating for modifying the sequence of perturbations in response to an applied electrical signal to change the shape of the grating transmission or reflection spectrum.

2. The modifiable fiber grating of claim 1 wherein said conductive elements modify the sequence of perturbations by local heating in response to an applied electrical signal.

3. The modifiable fiber grating of claim 1 wherein said fiber includes along said grating region an electrically actuable component responsive to an electrical signal applied to said electrodes for locally varying the fiber index.

4. The modifiable fiber grating of claim 3 wherein said electrically actuable component comprises an electro-optic material.

5. The modifiable fiber grating of claim 3 wherein said electrically actuable component comprises a magneto-optic material.

6. The modifiable grating of claim 3 wherein said actuable component comprises electro-optic material, magneto-optic material, piezoelectric material, electrostrictive material, magnetostrictive material or Faraday effect material.

7. The modifiable grating of claim 1 wherein said conductive elements comprise opposing electrode pairs for applying a voltage across said fiber.

8. The modifiable grating of claim 1 wherein said conductive elements comprise helical regions.

9. The modifiable fiber grating of claim 1 wherein said optical fiber grating comprises a Bragg grating.

10. The modifiable grating of claim 1 wherein said optical fiber grating is a long period grating.

11. The modifiable grating of claim 1 wherein said grating region comprises liquid crystal material.

12. The modifiable grating of claim 1 wherein said conductive elements are spaced apart by an edge-to-edge separation in the range between 1 millimeter and 200 nanometers.

13. The modifiable grating of claim 1 wherein the maximum lateral dimension of each conductive element is in the range between 500 micrometers and 100 nanometers.

14. The modifiable grating of claim 1 wherein said conductive elements comprise piezoelectric material, electrostrictive material or magnetostrictive material.

15. The modifiable grating of claim 1 wherein said conductive elements modify the sequence of perturbations to chirp the grating.

* * * * *